United States Patent
Choi et al.

(10) Patent No.: US 12,023,283 B2
(45) Date of Patent: Jul. 2, 2024

(54) MOTORIZED WHEELCHAIR AND CONTROL METHOD THEREOF

(71) Applicant: LG ELECTRONICS INC., Seoul (KR)

(72) Inventors: Haemin Choi, Seoul (KR); Wondong Do, Seoul (KR); Daekeun Yoon, Seoul (KR); Jaebeom Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1211 days.

(21) Appl. No.: 16/739,908

(22) Filed: Jan. 10, 2020

(65) Prior Publication Data
US 2020/0237586 A1     Jul. 30, 2020

(30) Foreign Application Priority Data
Jan. 29, 2019    (KR) ........................ 10-2019-0011274

(51) Int. Cl.
*A61G 5/04*        (2013.01)
*A61G 5/10*        (2006.01)
(Continued)

(52) U.S. Cl.
CPC ........... *A61G 5/041* (2013.01); *A61G 5/1016* (2013.01); *A61G 5/1032* (2013.01);
(Continued)

(58) Field of Classification Search
CPC .... A61G 5/041; A61G 5/1016; A61G 5/1032; A61G 5/1051; A61G 5/1091;
(Continued)

(56) References Cited

U.S. PATENT DOCUMENTS

| 2005/0087375 A1* | 4/2005 | Steele ..................... A61G 5/045 180/65.1 |
| 2012/0159916 A1* | 6/2012 | Ishii ........................ B60L 1/003 56/10.2 G |

(Continued)

FOREIGN PATENT DOCUMENTS

| KR | 10-2000-0036646 | 7/2000 |
| KR | 10-2002-0063053 | 8/2002 |

(Continued)

OTHER PUBLICATIONS

Korean Office Action dated Oct. 27, 2020 issued in KR Application No. 10-2019-0011274.

*Primary Examiner* — Adam R Mott
*Assistant Examiner* — Ricardo I Viscarra
(74) *Attorney, Agent, or Firm* — KED & ASSOCIATES, LLP

(57) ABSTRACT

A method of controlling a motorized wheelchair including a seat frame supporting a seat, a back frame to which the seat frame is detachably connected, a first main wheel and a second main wheel respectively installed at both lower ends of the back frame, an inclination detecting sensor which detects an inclination, and a controller which controls the main wheel and the second main wheel, includes receiving an input for a turning operation, calculating an inclination angle of a running ground by the inclination detecting sensor, and determining whether the inclination angle is greater than a reference angle.

6 Claims, 8 Drawing Sheets

(51) Int. Cl.
  *G01C 9/02* (2006.01)
  *G01P 3/44* (2006.01)
  *G01S 15/08* (2006.01)

(52) U.S. Cl.
  CPC .......... *A61G 5/1051* (2016.11); *A61G 5/1091* (2016.11); *G01C 9/02* (2013.01); *G01P 3/44* (2013.01); *G01S 15/08* (2013.01); *A61G 2203/36* (2013.01); *A61G 2203/42* (2013.01)

(58) Field of Classification Search
  CPC .. A61G 2203/36; A61G 2203/42; G01C 9/02; G01P 3/44; G01S 15/08
  See application file for complete search history.

(56) References Cited

U.S. PATENT DOCUMENTS

| | | | |
|---|---|---|---|
| 2013/0138315 A1* | 5/2013 | Lee | A61G 5/04 |
| | | | 701/70 |
| 2015/0115566 A1* | 4/2015 | Fertig | A61G 5/1035 |
| | | | 280/250.1 |
| 2020/0114958 A1* | 4/2020 | Oetken | B62D 6/001 |
| 2020/0253798 A1* | 8/2020 | Mizuno | A61G 5/048 |

FOREIGN PATENT DOCUMENTS

| | | |
|---|---|---|
| KR | 10-1386915 | 4/2014 |
| KR | 10-2015-0024537 | 3/2015 |

\* cited by examiner

MOTORIZED WHEELCHAIR AND CONTROL METHOD THEREOF

CROSS-REFERENCE TO RELATED APPLICATION

This application claims priority under 35 U.S.C. § 119 to Korean Application No. 10-2019-0011274 filed on Jan. 29, 2019, whose entire disclosure is hereby incorporated by reference.

BACKGROUND

Field

The present disclosure relates to a motorized wheelchair and a control method thereof.

2. BACKGROUND

A motorized wheelchair equipped with an electric motor has been provided as an apparatus for assisting people with difficulty in walking such as the disabled and the elderly. The electric motor is generally called a motor. In addition, the motor provides a driving force to drive the motorized wheelchair. In a conventional motorized wheelchair, since the volume and weight occupied by the motor are relatively large, there is a problem in that the motorized wheelchair is difficult to ride the vehicle and is inconvenient to be stored.

In order to solve those problems, Korean Patent Publication No. 2002-0063053 (hereinafter referred to as document 1) published on Aug. 1, 2002 discloses a wheelchair in which a small DC motor or a brushless (DC) motor is connected to each of wheels to reduce the volume of a driving device and the wheelchair is capable of being folded and a driving control method thereof. However, since the document 1 merely discloses a technique for minimizing the size of the motor and controlling the running speed of each wheel, there is a limit to minimize the volume of the motorized wheelchair. In addition, according to the document 1, the motorized wheelchair has a structure that is still difficult to be disassembled and therefore, there is a problem of low installation convenience. In addition, the wheel chair of document 1 has a problem in which it cannot provide any means and methods for providing a safe running when the motorized wheelchair runs on a ramp. For example, in a case where the motorized wheelchair is running on a downhill road, when the motorized wheelchair moves excessively fast, there is a risk of an accident.

In order to solve such a problem, Korean Patent Publication No. 2000-0036646 (hereinafter referred to as document 2) published on Jul. 5, 2000 discloses a wheelchair drive control system for variably controlling the torque of a motor such that the ratio of a motor drive force varies according to running conditions of the wheelchair, such as unevenness of a road surface, an inclination degree, an inclination direction, and the like. The document 2 discloses a technology of including a sensing means for sensing the inclination degree and inclination direction of the road surface, and the torque and speed of the wheel and variably controlling the torque of the motor by a signal input from the sensing means. Furthermore, document 2 may provide a braking force by the reverse torque of the motor on the downhill road. Therefore, when the motorized wheelchair runs on the downhill road, it is possible to achieve safe running.

However, the wheel chair of document 2 has a problem that the braking force due to the reverse torque of the motor increases the burden on the motor as the inclination angle of the downhill road increases. That is, excessive reverse torque of the motor on the downhill road may cause problems such as overheating and failure of the motor.

In addition, the document 2 does not disclose a technique for enabling the motorized wheelchair to rotate on the ramp. When the motorized wheelchair is driven to rotate (or turn) without considering the speed and the center of rotation of the motorized wheelchair on the ramp, a problem such as overturning of the motorized wheelchair, a fall of the user, or a risk of collision during running may occur. That is, document 2 does not suggest any means or method for enabling the motorized wheelchair to safely rotate (or turn) on a ramp.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
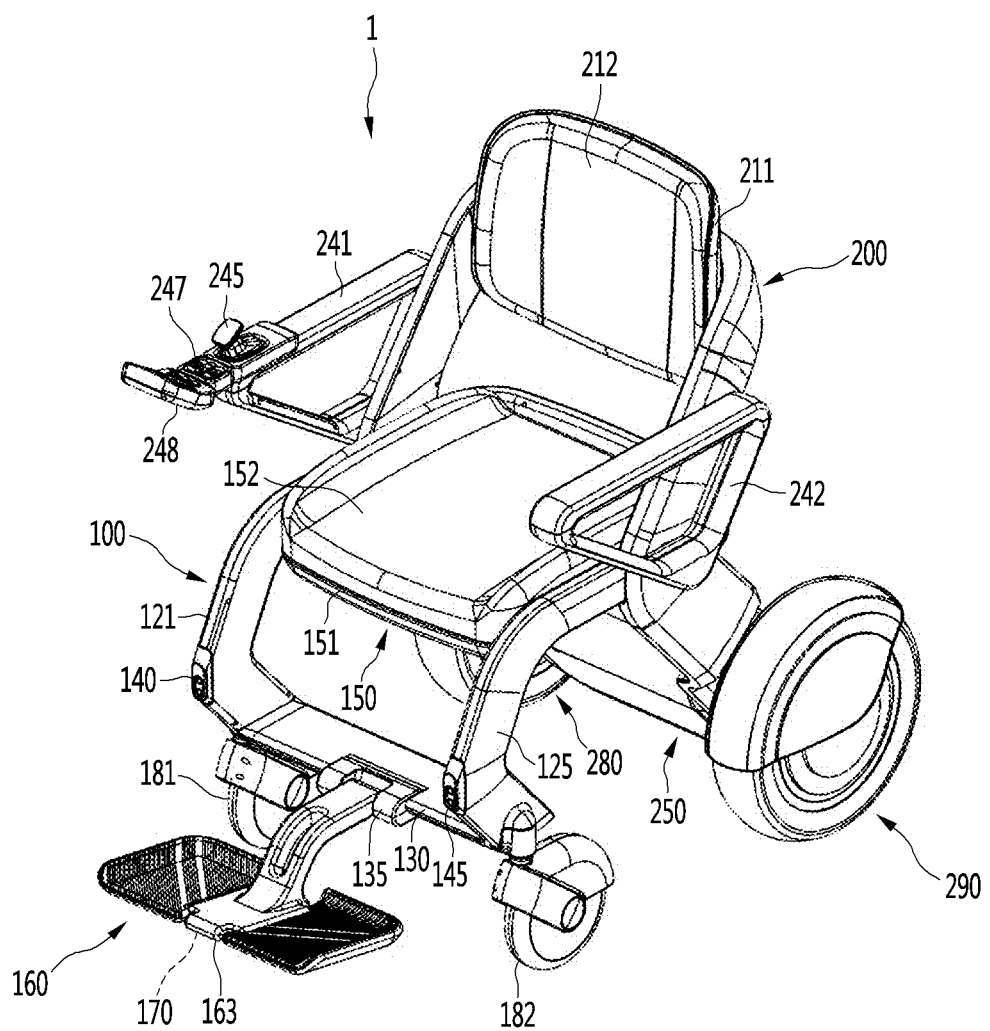
FIG. 1 is a front perspective view showing a motorized wheelchair according to an embodiment of the present disclosure.
Figure 2:
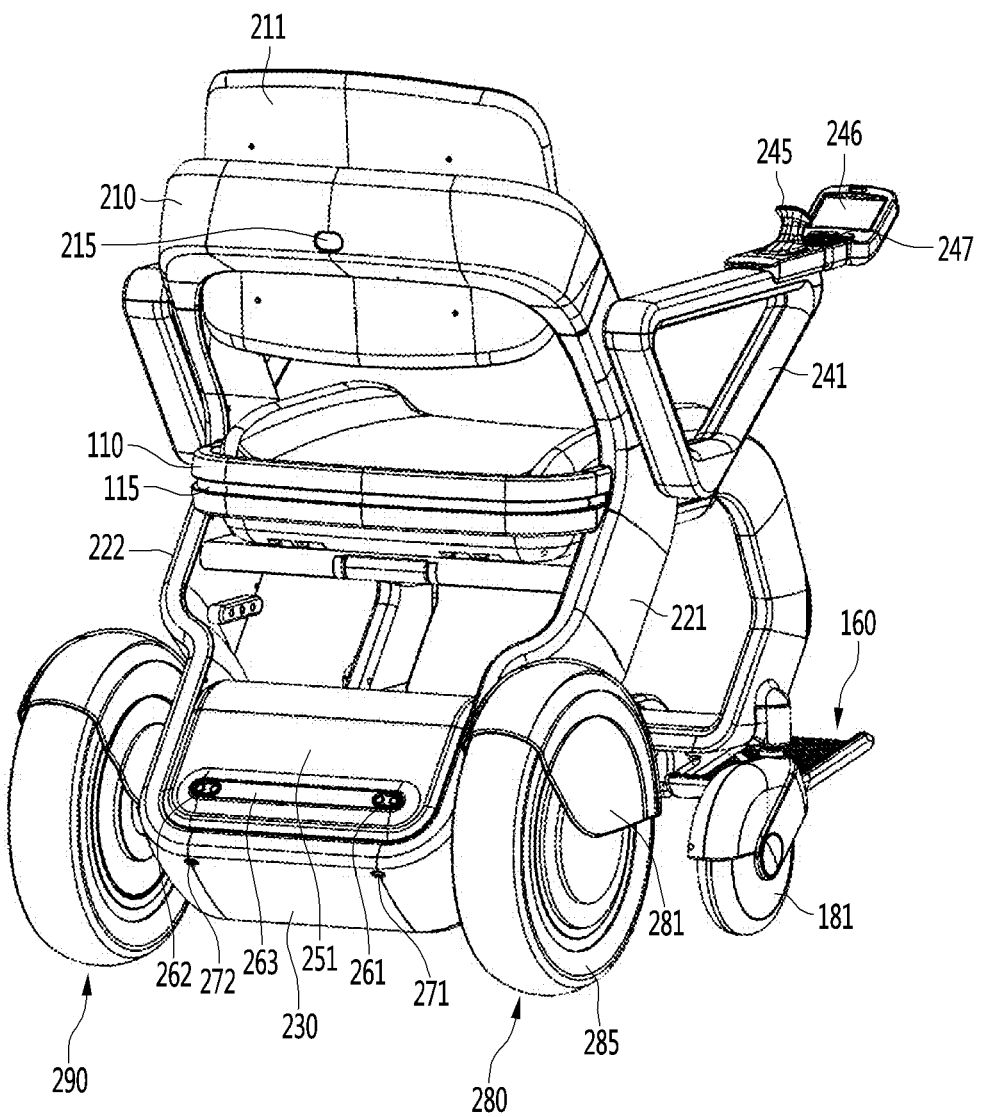
FIG. 2 is a rear perspective view showing a motorized wheelchair according to an embodiment of the present disclosure.

As depicted in FIGS. 1 to 4, a motorized wheelchair 1 according to an embodiment of the present disclosure may include a seat frame 100, front obstacle detecting sensors 140 and 145 installed on the seat frame 100, a foot guide 160 to be rotatably connected to the seat frame 100, sub-wheels 181, 182 connected to the seat frame 100 to guide driving, and a seat assembly 150 supported by the seat frame 100.

The seat frame 100 may form a frame to which the seat assembly 150 is connected therein. That is, the seat frame 100 may form a space in which the seat assembly 150 is mounted. The seat frame 100 may extend to form a closed curve in which both ends thereof coincide each other. For example, the seat frame 100 may have a shape of (e.g., an invert L-shape) when viewed from the side.

The seat frame 100 may include a rear frame 110, leg frames 121 and 125 respectively extending forward from both side ends of the rear frame 110, and a front frame 130 connected to lower ends of the leg frames 121 and 125. That is, the rear frame 110 may form a rear portion of the seat frame 100, the leg frames 121 and 125 may form both side portions of the seat frame 110, and the front frame 130 may form a front portion of the seat frame 100. The rear frame 110 may extend in a lateral direction to cover the rear surface of the seat assembly 150.

The leg frames 121 and 125 may extend forward from the both side ends of the rear frame 110 to cover both side surfaces of the seat assembly 150. The leg frames 121 and 125 may include a first leg frame 121 extending from one side end of the rear frame 110 and a second leg frame 125 extending from the other side end of the rear frame 110. For example, the first leg frame 121 may extend from a right end of the rear frame 110, and the second leg frame 125 may extend from a left end of the rear frame 110. Therefore, the first leg frame 121 may be laterally spaced apart from the second leg frame 125.

The first leg frame 121 and the second leg frame 125 may be formed in the same shape. That is, the first leg frame 121 and the second leg frame 125 may be formed to be symmetrical with each other. In addition, the leg frames 121 and 125 may extend to be bent a plurality of times. In other words, each of the leg frames 121 and 125 may extend such that the extending direction thereof is changed at least one or more times. That is, the leg frames 121 and 125 may extend forward and then downward. For example, the leg frames 121 and 125 may have a shape of an approximately when viewed from the side.

As a result, upper portions of the leg frames 121 and 125 may extend forward to support the seat assembly 150. The lower portions of the leg frames 121 and 125 may be connected to the front frame 130 to support the foot guide 160. For example, the leg frames 121 and 125 may have an approximately 'hook' shape when viewed from the side. As another example, the lower portions of the leg frames 121 and 125 may have a shape of 'leg with knee bent' or '<' when viewed from the side.

In addition, front ends of the leg frames 121 and 125 may be positioned at the most forward portion of the seat frame 100. As a result, the front ends of the leg frames 121 and 125 may be understood as the front end of the seat frame 100.

A cutout groove 126 may be formed at the front ends of the leg frames 121 and 125. The front obstacle detecting sensors 140 and 145 may be installed in the cutout groove 126. The front obstacle detecting sensors 140 and 145 may include an ultrasonic sensor (USS). The front obstacle detecting sensors 140 and 145 may include an ultrasonic sensor capable of detecting a change in distance. Accordingly, the front obstacle detecting sensors 140 and 145 may detect how much a distance to the front obstacle changes.

The front obstacle detecting sensors 140 and 145 may be installed at the front ends of the leg frames 121 and 125. That is, the front obstacle detecting sensors 140 and 145 may be connected to the front end of the seat frame 100. In addition, the front obstacle detecting sensors 140 and 145 may include a first front obstacle detecting sensor 140 connected to the first leg frame 121, and a second front obstacle detecting sensor 145 connected to the second leg frame 125.

Since the front obstacle detecting sensors 140 and 145 are installed at the most forward portion of the seat frame 100, an obstacle detection range may be expanded to the maximum in the driving direction of the motorized wheelchair 1. That is, the front obstacle detecting sensors 140 and 145 may be installed to minimize interference with other components.

The rear portions of the leg frames 121 and 125 may be slidably inserted into a back frame 200 to be described later. In detail, the rear portion of the first leg frame 121 and the rear portion of the second leg frame 125 may be slidably inserted into or slidably drawn out an insertion groove 221a formed on an inner surface of the back frame 200.

To this end, the leg frames 121 and 125 may include a slide groove 115 for guiding coupling with the back frame 200. The slide groove 115 may be recessed inward from the outer surfaces of the leg frames 121 and 125. The slide groove 115 may extend in a straight line toward the rear ends of the leg frames 121 and 125. Of course, the slide groove 115 may extend from the first leg frame 121 to the second leg frame 125 via the rear frame 110.

A slide guide 223 formed in the insertion groove 221a to be described later may be inserted into the slide groove 115. As the slide guide 223 inserted into the slide groove 115 moves forward or backward, the seat frame 100 may be easily separated from or connected to the back frame 200.

The leg frames 121 and 125 may further include wheel coupling parts 124 and 129 to which the sub wheels 181 and 182 for driving of the motorized wheelchair 1 are connected. The wheel coupling parts 124 and 129 may be formed at the lower ends of the outer surfaces of the leg frames 121 and 125.

In more detail, the wheel coupling parts 124 and 129 may include a first wheel coupling part 124 formed in the first leg frame 121 and a second wheel coupling part 129 formed in the second leg frame 125. The first wheel coupling part 124 may be located at the lower end of the outer surface of the first leg frame 121. Similarly, the second wheel coupling part 129 may be located at the lower end of the outer surface of the second leg frame 125. That is, the sub wheels 181 and 182 may be connected to the lower end of the seat frame 100 to enable a rolling motion.

The sub wheels 181 and 182 may be subordinate to the main wheels 280 and 290 that provide a driving force, which will be described later to perform the rolling motion. That is, the sub wheels 181 and 182 may guide the driving of the motorized wheelchair 1 by assisting the main wheels 280 and 290. For example, the sub wheels 181 and 182 may include casters. Of course, the sub wheels 181 and 182 may be provided with a separate driving device.

The sub wheels 181 and 182 may include a first sub wheel 181 connected to one of the leg frames 121 and 125 to perform the rolling motion and a second wheel 182 connected to the other of the leg frames 121 and 125 to perform the rolling motion. In detail, the first sub wheel 181 may be connected to the first wheel coupling part 124. The second sub wheel 182 may be connected to the second wheel coupling part 124. That is, the first sub wheel 181 may be positioned to be spaced apart from the second sub wheel 182 in a lateral direction. Therefore, since the first sub wheel 181 and the second sub wheel 182 support both lower ends of the seat frame 100, the motorized wheelchair 1 may stably drive together with the main wheels 280 and 290.

The front frame 130 may be connected to the lower ends of the leg frames 121 and 125. For example, the front frame 130 may extend from the lower end of the first leg frame 121 to the lower end of the second leg frame 125. Here, the front frame 130 may be located inside the leg frames 121 and 125, and the wheel coupling parts 124 and 129 may be located outside the leg frames 121 and 125.

The foot guide 160 connected to the front frame 130 may be rotated backward on the inside of the leg frames 121 and 125 when not in use. According to this, there is no interference with the front obstacle detecting sensors 140 and 145. The front frame 130 may extend in a lateral direction to connect the lower ends of the first leg frame 121 and the second leg frame 125.

The front end of the front frame 130 may be located more backward than the front ends of the leg frames 121 and 125. Therefore, the obstacle detecting sensors 140 and 145 installed at the front ends of the leg frames 121 and 125 may detect an obstacle without interference with the front frame 130.

The front frame 130 may include a hinge part 135 to which the foot guide 160 is able to be rotatably connected. The hinge part 135 may be formed at the front end of the front frame 130. In addition, the hinge part 135 may be recessed backward from the center portion of the front end of the front frame 130 to form a space in which the foot guide 160 is installed. That is, the foot guide 160 may be rotatably connected to the front frame 130. The foot guide 160 may be connected to rotate upward of the hinge part 135 (see the arrow in FIG. 4).

In detail, the foot guide 160 is a rotating shaft (not shown) connected to the hinge part 135, a rotating plate 163 connected to the rotating shaft and extending forward, and a footrest connected to both sides of the rotating plate 163 to support both feet of a user. The rotating shaft may be connected to the hinge part 135. The rotating plate 163 may rotate together along the rotation of the rotating shaft. That is, the rotating plate 163 may rotate in a clockwise direction around the rotating shaft. The footrest may be rotatably connected to both side ends of the rotating plate 163 (See the arrow in FIG. 4).

The seat assembly 150 may include a base plate 151 connected to the seat frame 100, a seat 152 installed on an upper surface of the base plate 151, a battery (not shown) that provides power, and a battery cover extending downward from the base plate 151 to accommodate the battery. The base plate 151 may be connected to upper portions of the leg frames 121 and 125. In detail, the base plate 151 may be provided such that an upper portion of the first leg frame 121 and an upper portion of the second leg frame 125 are connected to each other. For example, the second base plate 151 may extend from an inner surface of the first leg frame 121 extending in a straight line from the rear frame 110 to an inner surface of the second leg frame 125 extending in a straight line from the rear frame 110. That is, the base plate 151 may extend to shield an inner upper space formed by the rear frame 110, the first leg frame 121, and the second leg frame 125.

The seat 152 may be located over the base plate 151. The seat 152 may be formed of a fabric. For example, the seat 152 may be made of a soft and resilient material such that the user is able to sit comfortably.

The battery may be located below the base plate 151. The battery may supply power to the electronic parts of the motorized wheelchair 1, such as drive motors 283 and 293 provided in the main wheels 280 and 293, various board PCBs, inverters and converters provided in the control box 250, a control stick 245 for controlling driving, a display 246, an input button 247 and the like.

The battery may supply power to the electronic parts only when the seat frame 100 is connected to the back frame 200. The battery cover may extend downward along the circumference of the base plate to cover the battery from below. That is, the battery cover may be connected to the lower side of the base plate 151, and the battery may be installed in an inner space formed by the battery cover 154 and the base plate 151.

On the other hand, the motorized wheelchair 1 may further include a front height difference sensor 170 capable of detecting the height difference of a running ground. Hereinafter, the ground on which the motorized wheelchair 1 drives may be referred to as a "running surface". The front height difference sensor 170 may include an infrared position sensitive device (PSD). The front height difference sensor 170 may be installed in the foot guide 160. In detail, the front height difference sensor 170 may be connected to the front portion of the foot guide 160 so as to face the ground.

In addition, the foot guide 160 may be disposed to be inclined upwardly from the running surface (or the ground) to maximize the performance of the front height difference sensor 170. When the foot guide 160 is rotated counterclockwise toward the front to support the user's feet, the foot guide 160 may be located more frontward than the sub wheels 181 and 182. Therefore, the front height difference sensor 170 may detect a height difference (step) of the driving surface that has not yet reached along the driving direction of the motorized wheelchair 1.

The motorized wheelchair 1 may further include a back frame 200 that is detachably connected to the seat frame 100, a back plate 211 connected to the back frame 200 to support the user's back and a cushion 121. The cushion 212 may be formed of the same material as the seat 152. The back plate 211 may be connected to the rear side of the cushion 212.

The back plate 211 may be integrally connected with the cushion 212. Thus, the back plate 211 and the cushion 212 may be referred to as a "backrest". The back plate 211 may be connected to the front surface of the back frame 200. Here, the back plate 211 and the cushion 212 may be positioned higher than the seat 152.

The back frame 200 may form a frame into which the seat frame 100 is vertically inserted, on the inside thereof. That is, the back frame 200 may form a space that is open in the front and rear direction by the width of the seat frame 100 such that the seat frame 100 is able to be slidably inserted into the inner surface.

The back frame 100 may extend to form a closed curve in which both ends thereof coincide each other. For example, the back frame 200 may have a shape of '<' (or inverted V) when viewed from the side.

The back frame 200 may include an upper frame 210, side frames 221 and 222 extending downward from both side ends of the upper frame 210, and a low frame 230 connected to lower ends of the side frames 221 and 222. The upper frame 210 may form an upper portion of the back frame 200, the side frames 221 and 222 may form both side portions of the back frame 200, and the low frame 230 may form a lower portion of the back frame 200.

The motorized wheelchair 1 may further include a rear camera 215 installed in the upper frame 210. The rear camera 215 may be installed in the upper frame 210 such that lens is exposed to the rear. For example, the rear camera 215 may be installed in a rear surface of the upper frame 210. Accordingly, the rear camera 215 may photograph the rear of the motorized wheelchair 1.

The upper frame 210 may fix the back plate 211 and the cushion 212. Therefore, the upper frame 210 may be located in an upper portion of the motorized wheelchair 1 so as to support the back of the user. The upper frame 210 may extend in a lateral direction to cover the back plate 211 from the rear.

The side frames 221 and 222 may extend downward from both side ends of the upper frame 210. In detail, the side frames 221 and 222 may include a first side frame 221 extending from one side end of the upper frame 210 and a second side frame 222 extending from the other side end of the upper frame 210. For example, the first side frame 221 may extend from a right end of the upper frame 210, and the second side frame 222 may extend from a left end of the upper frame 210. Therefore, the first side frame 221 may be laterally spaced apart from the second side frame 222.

The first side frame 221 and the second side frame 222 may be formed in the same shape. That is, the first side frame 221 and the second side frame 222 may be formed to be symmetrical with each other. In addition, the side frames 221 and 222 may extend such that the extending direction thereof is changed at least one or more times.

In detail, the side frames 221 and 222 may extend to be downwardly inclined forward from the both side ends of the upper frame 210 to a point at which the seat frame 100 is connected, and extend to be downwardly inclined rearward from the point at which the seat frame 100 is connected. For example, the side frames 221 and 222 may have a shape of substantially '<' when viewed from the side. According to this, the coupling of the seat frame 100 and the back frame 200 is relatively close to the center of gravity of the motorized wheelchair 1, thus achieving a more stable coupling. In addition, the seat 152 and the cushion 212 may be provided at an angle at which the hip and back of the user are comfortably supported, thus achieving a more human-friendly comfort.

The side frames 221 and 222 may be formed with an insertion groove 221a into which the seat frame 100 is inserted. The outer surfaces of the leg frames 121 and 125 may be slidably inserted into the insertion groove 221a. For example, the insertion groove 221a may be formed such that the leg frames 121 and 125 are fitted thereto in the front-rear direction. That is, the insertion groove 221a may be formed at a point where the side frames 221 and 222 and the seat frame 100 are connected to each other.

The insertion groove 221a may be formed to be outwardly recessed in the inner surfaces of the side frames 221 and 222. The insertion groove 221a may be formed such that a recessed space extends in the front-rear direction. For example, the insertion groove 221 may be formed such that the recessed space extends from the front end to the rear end in the center portion of the side frames 221 and 222.

The insertion groove 221a formed in the first side frame 221 may be referred to as a first insertion groove 221a, and the insertion groove (not shown) formed in the second side frame 222 may be referred to as a second insertion groove An outer surface of the first leg frame 121 may be slidably inserted into the first insertion groove 221a, and an outer surface of the second leg frame 125 is slidably inserted into the second insertion groove (not shown).

The side frames 221 and 222 may further include a slide guide 223 positioned in the insertion groove 221a and protruding from the inner surfaces of the side frames 221 and 222. The slide guide 223 may be inserted into the slide groove 115 formed in the leg frames 121 and 125. That is, the slide guide 223 and the slide groove 115 may guide the leg frames 121 and 125 to be connected to the insertion groove 221a. The slide guide 223 may protrude in a shape corresponding to the slide groove 115. The slide guide 223 may extend in the front-rear direction.

The back frame 200 may further include a guide plate 225 supporting a lower portion of the seat assembly 150. The guide plate 225 may be located at a lower position than the insertion groove 221a. The guide plate 225 may be formed to support the bottom surface of the seat assembly 150 when the seat frame 100 is connected to the back frame 200. In detail, the guide plate 225 may extend in a lateral direction such that the center portion of the first side frame 221 and the center portion of the second side frame 222 are connected to each other.

The low frame 230 may be connected to lower ends of the side frames 221 and 222. In detail, the low frame 230 may extend from the lower end of the first side frame 221 to the lower end of the second side frame 222. That is, the low frame 230 may extend in a lateral direction to connect the lower end of the first side frame 221 and the lower end of the second side frame 222.

In addition, the low frame 230 may be disposed to have a predetermined inclination in the front-rear direction. That is, the low frame 230 may extend to be inclined with the ground in the front-rear direction. In detail, the rear end of the low frame 230 may be located higher than the front end of the low frame 230. That is, the low frame 230 may extend to be inclined upward from the front end to the rear. In summary, the low frame 230 may extend to connect the side frames 221 and 222 in a lateral direction, and may extend to be inclined such that the front end is located below the rear end in the front-rear direction.

According to this configuration, there is an advantage that the detection ranges of the rear height difference sensors 271 and 272, which will be described later, installed in the low frame 230 are further expanded to the rear. That is, when the motorized wheelchair 1 moves backward, the rear height difference sensors 271 and 272 may identify the height difference with respect to the running surface (or the ground) even at a farther distance. Therefore, it is possible to improve driving safety even at a relatively high speed.

Here, the inclined surface extending in the front-rear direction of the low frame 230 may be formed to have an acute angle with the running surface (or the ground). For example, the inclined surface of the low frame 230 may be formed to have an angle with the running surface at an angle of 0~60°.

The low frame 230 may be provided with the rear height difference sensors 271 and 272 to face the running surface (or the ground). Therefore, when the inclined surface of the low frame 230 is formed to have an angle the running surface greater than or equal to an acute angle, the area covered by the rear height difference sensors 271 and 272 may be out of an allowable range.

The motorized wheelchair 1 may further include the rear height difference sensor 271 or 272 installed on the bottom of the back frame 200, the control box 250 provided with a plurality of electronic parts, the rear obstacle detecting sensor 261 or 262 installed in the control box 250, and the main wheels 280 and 290 positioned at both lower ends of the side frames 221 and 222.

The rear height difference sensor 271 or 272 may be connected to the low frame 230 to detect a height difference of the running surface (or the ground) when the motorized wheelchair 1 moves backward. The rear height difference sensors 271 or 272 may be connected to a rear end of the low frame 230. The rear height difference sensor 271 or 272 may include an infrared position sensitive device (PSD).

The rear height difference sensor 271 or 272 may be provided in plurality. For example, the rear height difference sensors 271 and 272 may include a first rear height difference sensor 271 and a second rear height difference sensor 272 spaced apart laterally from the first rear height difference sensor 271. The rear height difference sensor 271 or 272 may be provided to have the same configuration as the front height difference sensor 170.

The control box 250 may be installed at the lower end of the back frame 200. Specifically, the control box 250 may be supported by the inner surfaces of the side frames 221 and 222 and the inner surface of the low frame 230. The low frame 230 may form a surface supporting the control box 250. The control box 250 may be provided with a plurality of electronic parts therein. For example, the plurality of electronic parts may include an inverter, a DC converter, a microcomputer, a main board, and a plurality of PCBs.

In addition, the plurality of electronic parts provided in the control box 250 may be electrically connected to the components of the motorized wheelchair 1. Therefore, the plurality of electronic parts may constitute a controller 300 for controlling the operation of the motorized wheelchair 1. That is, the motorized wheelchair 1 may further include a controller 300 (see FIG. 6) for controlling each component.

A plurality of front parts may further include a memory 310 that is a storage medium. The memory 310 may store speed limit information of the motorized wheelchair 1 according to an inclination angle of the inclined ground (hereinafter, referred to as a "ramp"). In addition, the memory 310 may store information on a inclination angle (hereinafter, referred to as a "reference angle") as a reference for determining a turning operation of the motorized wheelchair 1.

In addition, the controller 300 may perform a determination for control of the motorized wheelchair 1 using the information stored in the memory 310. For example, when the motorized wheelchair 1 runs on a ramp, the controller 300 may receive the speed limit information from the memory 310 to determine a speed limit according to the ramp angle of the ramp. Therefore, the controller 300 may determine a current speed limit of the motorized wheelchair 1.s The controller 300 may control the operation of the main wheels 280 and 290 such that the motorized wheelchair 1 does not exceed the determined speed limit.

The control box 250 may include a box case 251 that protects the plurality of electronic parts. The box case 251 may extend from the front end of the low frame 230 to the rear end of the low frame 230 such that both side ends thereof are connected to the first side frame 221 and the second side frame 222. For example, the box case 251 may extend upward from the front end of the low frame 230 and be bent backward to be rounded, and then extend downward to the rear end of the low frame 230. In addition, a board plate to which the plurality of electronic parts are connected may be located in an inner space formed by the box case 251.

The rear obstacle detecting sensor 261 or 262 may be installed in the control box 250. In detail, the rear obstacle detecting sensor 261 or 262 may be installed in the rear surface of the box case 251. The rear obstacle detecting sensor 261 or 262 may be connected to the box case 251 to be exposed to the outside. The rear obstacle detecting sensors 261 and 262 may include an ultrasonic sensor (USS). The rear obstacle detecting sensor 261 or 262 may be provided to have the same configuration as the front obstacle detecting sensor 261 or 262.

Since the low frame 230 extends to be inclined in the front-rear direction, the rear surface of the box case 251 may also have a predetermined inclination with respect to the ground. For example, the low frame 230 and the rear surface of the box case 251 may have a shape of '<' when viewed from the side. Thus, the rear obstacle detecting sensor 261 or 262 may be installed to be inclined relatively upward. Accordingly, the rear obstacle detecting sensor 261 or 262 may monitor the rear region of the motorized wheelchair 1 more widely.

The rear obstacle detecting sensor 261 or 262 may be provided in plurality. For example, the rear obstacle detecting sensors 261 and 262 may include a first rear obstacle detecting sensor 261 and a second rear obstacle detecting sensor 262 laterally spaced apart from the first rear obstacle detecting sensor 261.

The rear obstacle detecting sensor 261 or 262 may further include a light emitting case 263. The light emitting case 263 may be provided with a light emitting diode (LED). Therefore, the light emitting case 263 may provide light according to an operation mode of the motorized wheelchair 1. For example, the light emitting case 263 may provide light in various colors according to various operating environments such as whether a rear obstacle is detected, whether a brake of the motorized wheelchair 1 is activated, or whether the motorized wheelchair 1 moves backward.

The light emitting case 263 may be located in the rear surface of the box case 251. The light emitting case 263 may elongate in a lateral direction to cover the first rear obstacle detecting sensor 261 and the second rear obstacle detecting sensor 262.

The main wheels 280 and 290 may be located at both lower ends of the back frame 200. That is, the main wheels 280 and 290 may be connected to the lower portions of the side frames 221 and 222 to provide a force for driving the motorized wheelchair 1. The main wheels 280 and 290 may include a first main wheel 280 and the second main wheel 290. The first main wheel 280 may be installed under the first side frame 221. The second main wheel 290 may be installed under the second side frame 222.

Figure 3:
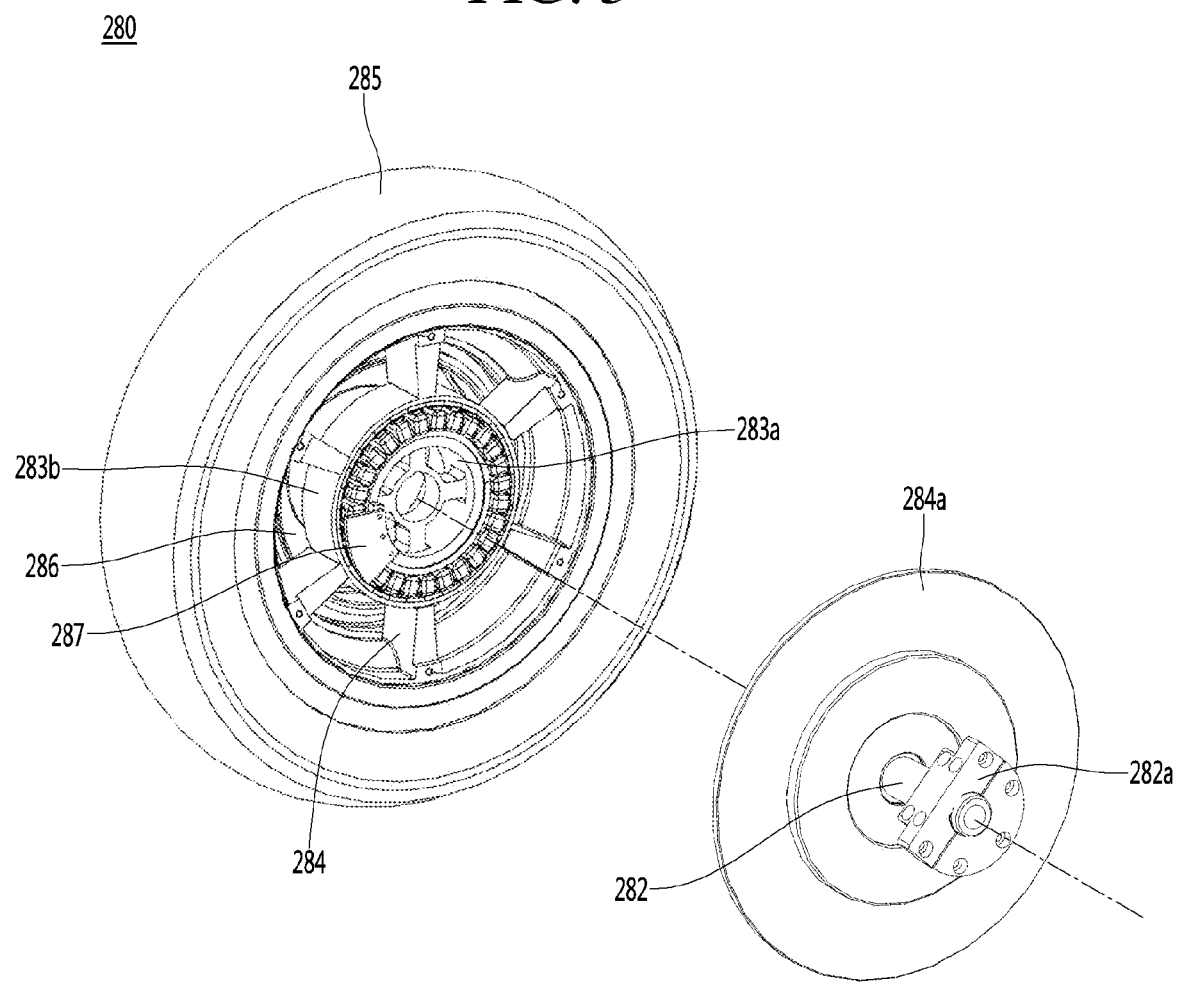
FIG. 3 is an exploded perspective view showing a configuration of a main wheel according to an embodiment of the present disclosure.

Referring to FIG. 3, the configuration of the main wheel 280 or 290 will be described in detail. It may be noted that, for convenience of description, FIG. 3 shows the configuration of the first main wheel 280 on behalf of the main wheels 280 and 290.

The second main wheel 290 may have the same configuration as the first main wheel 280. Therefore, the following description for the first main wheel 280 will be used as a description for the second main wheel 290. The main wheel 280 or 290 may include a wheel case 281, a tire 285, a drive motor 283 or 293, a rim 284, a wheel bracket 284a, a wheel shaft 282, a shaft bracket 282a, a wheel detecting sensor (or first sensor) 287 or 297 and a brake 286 or 296.

The wheel case 281 may be provided to cover an upper portion of the tire 285. For example, the wheel chase 281 may be connected to the side frame 221 or 222 to shield the upper portion of the tire 285. The drive motor 283 or 293 may receive power from the battery. Accordingly, the drive motor 283 or 293 may provide a driving force for rotating the main wheel 280 or 290.

The drive motors 283 and 293 may include a first drive motor 283 that is a configuration of the first main wheel 280 and a second drive motor 293 that is a configuration of the second main wheel 290. The main wheels 280 and 290 may perform a rolling motion by the activation of the drive motors 283 and 293. That is, the motorized wheelchair 1 may run on the ground by rolling the main wheels 280 and 290. The sub wheels 181 and 182 may be subordinate to the main wheels 280 and 290 to perform a rolling motion. Accordingly, the motorized wheelchair 1 may stably run due to the sub wheels 181 and 182 on front side and the main wheels 280 and 290 on rear side.

The drive motor 283 or 293 may include an outer rotor type. For example, the drive motor 283 or 293 may include a stator 283a connected to the wheel shaft 282 and a rotor 283b disposed to surround the stator 283a in a radial direction. The drive motor 283 or 293 may further include a plurality of magnets, insulators, and coils. The rotor 283b may rotate by an electrical action of the magnet and the coil in the circumferential direction of the stator 283a. The wheel shaft 282 may be connected to the center of the stator 283a. The wheel shaft 282 may be fixed by the shaft bracket 282a.

The shaft bracket 282a may be connected to the inner surface of the side frame 221 or 22. The shaft bracket 282a may couple the wheel shaft 282 to a center thereof. Accordingly, the wheel shaft 282 may be fixed to the side frame 221 or 222 by the shaft bracket 282a. That is, one side end of the wheel shaft 282 may be connected to an inner surface of the side frame 221 or 222 by the shaft bracket 282a, and the other side end of the wheel shaft 282 may be connected to the stator 283a of the drive motor 283 or 293.

The rim 284 may extend radially from the rotor 283b surrounding the stator 283a. The rim 284 may form an outer circumference extending in the circumferential direction from a position spaced apart from the stator 283a by a predetermined radius. The tire 285 may be fitted to the outer circumference.

The wheel bracket 284a may be installed to shield the side surface of the rim 284. For example, the sides of the rim 284 facing the side frames 221 and 222 may be may be open. The wheel bracket 284a may be located at the open sides. Accordingly, the wheel shaft 282 may pass through the wheel bracket 284a to be connected to the stator 283a.

In addition, the brakes 286 and 296 may be installed on the rim. For example, the brakes 286 and 296 may be installed on the side opposite to the side where the wheel bracket 284a is located. The brakes 286 and 296 may be installed to brake the rim 284 that rotate together by the rotation of the rotor 283b. For example, the brakes 286 and 296 may contact the rim 284 to stop rotation when it is necessary to brake the rim 284. Thus, the brakes 286 and 296 may quickly stop the rotation of the main wheels 280 and 290.

The brakes 286 and 296 may be activated by a command signal of the controller 300. For example, the controller 300 may activate the brakes 286 and 296 to brake or decelerate the motorized wheelchair 1. The brakes 286 and 296 may include a first brake 286 installed on the first main wheel 280 and a second brake 296 installed on the second main wheel 290.

The wheel detecting sensor 287 or 297 may detect rotational speeds of the main wheels 280 or 290. The wheel detecting sensor 287 and 297 may be installed on the stator 283a to detect rotation of the rotor 283b. For example, the wheel detecting sensor 287 or 297 may be installed on a boss connected to the stator 283a. The wheel detecting sensor 287 or 297 may be fixed at a position on one side corresponding to the circumference of the rotor 283b.

The wheel detecting sensor 287 or 297 may include a Hall sensor. Accordingly, it is possible to determine the rotational speed of the drive motor 283 or 293, whether or not overcurrent occurs, or the like. The wheel detecting sensors 287 and 297 may include a first wheel detecting sensor 287 that is a configuration of the first main wheel 280 and a second wheel detecting sensor 297 that is a configuration of the second main wheel 290.

The motorized wheelchair 1 may further include armrests 241 and 242 connected to the outer surface of the back frame 200. The armrests 241 and 242 may be portions supporting the user's arms or hands. The armrests 241 and 242 may have a triangular shape and may be rotatably connected to both sides of the back frame 200, respectively. For example, the armrests 241 and 242 may be hinged to the back frame 200.

The armrests 241 and 242 may include a first armrest 241 connected to a first side frame 221 and a second armrest 242 connected to a second side frame 222. For example, the first armrest 241 may support the user's right arm, and the second armrest 242 may support the user's left arm.

The motorized wheelchair 1 may further include input units (or input device) 245 and 247 for receiving a user input and output units (or output device) 246 and 248 for outputting information. The input units 245 and 247 and the output units 246 and 248 may be installed on the armrests 241 and 242. For example, the input units 245 and 247 and the output units 246 and 248 may be installed on the first armrest 241 or the second armrest 242.

The input units 245 and 247 and the output units 246 and 248 may be detachably connected to the armrests 241 and 242. For example, the input units 245 and 247 and the output units 246 and 248 may be formed as one module. The input units 245 and 247 and the output units 246 and 248 may be configured to be fitted rearward from front ends of the armrests 241 and 242.

Therefore, when the user is right-handed, the input units 245 and 247 and the output units 246 and 248 may be easily installed on the first armrest 241. On the contrary, when the user is left-handed, the input units 245 and 247 and the output units 246 and 248 may be easily removed from the first armrest 241 frontward and installed on the second armrest 242.

The input units 245 and 247 may include the control stick 245 for controlling a running direction, a speed, and the like of the motorized wheelchair 1. The control stick 245 may be provided to be able to move up, down, left and right and rotate 360 degrees. The control stick 245 may control movement directions of the main wheels 280 and 290. That is, the control stick 245 may be understood as a steering device of the motorized wheelchair 1. Therefore, the user may determine the running direction of the motorized wheelchair 1 by moving the stick while holding the stick.

In addition, the user may accelerate the rotational speed of the main wheels 280 and 290 by maintaining the control stick 245 in a moving state for a predetermined time in a direction that matches the running direction of the motorized wheelchair 1. In addition, when the user maintains the control stick 245 in a direction opposite to the running direction of the motorized wheelchair 1 by 180 degrees for a predetermined time, the user may reduce the rotational speeds of the main wheels 280 and 290. Accordingly, the user may simply control the speed and the running direction of the motorized wheelchair 1.

In addition, the control stick 245 may be provided with a vibrating device. In addition, the vibrating device may be operated by receiving a command signal from the controller 300. For example, when an obstacle is detected during running of the motorized wheelchair 1 or a height difference is detected on the running surface, the controller 300 may generate vibration in the control stick 245 by operating the vibrating device. Accordingly, the user may perceive risk information by tactile sense.

In addition, the input units 245 and 247 may further include an input button 247 formed in front of the control stick 245. The input button 247 may be provided so as to allow a user to easily input various convenience functions of the motorized wheelchair 1. Of course, the control stick 245 may be provided with a plurality of input buttons. The buttons provided in the control stick 235 may be used as an input device for control convenience for the user.

The output units 246 and 248 may include a display 246 that displays visual information and a speaker 248. The display 246 may be located at the front end of the armrest 241 or 242. The display 246 may be installed to be inclined upward from the front end of the armrest 241 or 242. Accordingly, the direction of the display 246 coincides with the user's gaze direction which is directed downward, thus enabling the user to comfortably check the display 246.

The display 246 may display various information of the motorized wheelchair 1. For example, the display 246 may output various screens such as a running speed, a running path, whether an obstacle is detected, whether a height difference is detected, a warning message, a user input menu or the like of the motorized wheelchair 1.

The controller 300 may determine an environment that may adversely affects safety while running of the motorized wheelchair 1 based on detection signals received from the obstacle detecting sensors 140, 145, 261 and 262, the height difference sensors 170, 271 and 272 and the rear camera 215, and allow the display 246 to display risk information. Accordingly, the user may recognize the risk information visually.

In addition, the display 246 may include a touch type display capable of enabling a touch input. For example, the user may check a message output on the display 246 and perform a related input by touching at least one of the display 246, the input button 247, and the control stick 245.

The speaker 248 may be installed together on a cover accommodating the display 246. As one example, the speaker 248 may be located behind the display 246. Of course, the installation position of the speaker 248 is not limited thereto. The speaker 248 may be operated by receiving a command signal from the controller 300. For example, when an obstacle is detected in the running direction of the motorized wheelchair 1, the controller 300 may allow the speaker 248 to output sounds having different frequencies and magnitudes according to a distance from the obstacle that is approaching. In this way, the user may perceive the risk information by hearing.

The front obstacle detecting sensors 140 and 145 and the front height difference sensor 170 may be referred to as a "front detecting sensor". In addition, the rear obstacle detecting sensors 261 and 262, the rear height difference sensors 271 and 272 and the rear camera 215 may be referred to as a "rear detecting sensor".

Figure 4:
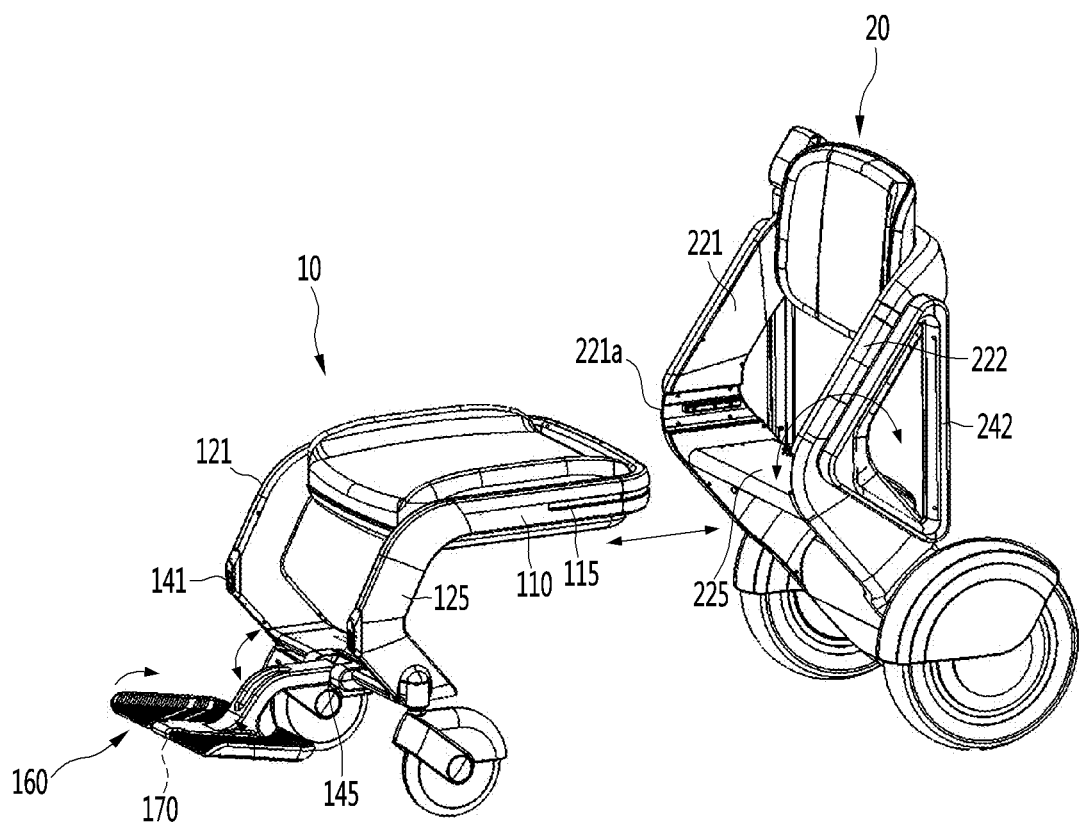
FIG. 4 is a perspective view showing a state in which a motorized wheelchair is disassembled according to an embodiment of the present disclosure

Referring to FIG. 4, the motorized wheelchair 1 according to an embodiment of the present disclosure may include a first part 10 and a second part 20 which are detachably connected to each other. The first part 10 may be configured to support the lower body of the user, and the second part 20 may be configured to support the upper body of the user. Accordingly, the first part 10 may be referred to as a "seating part", and the second part 20 may be referred to as a "backrest part".

The first part 10 may include the seat frame 100, the seat assembly 150, the foot guide 160, and the sub wheels 181 and 182. In addition, the front detecting sensors 140, 145, and 170 may be installed in the first part 10.

The second part 20 may include the back frame 200, the back plate 211, the cushion 212, the guide plate 225, the armrests 241 and 242, the control stick 245, the display 246, the input button 247, the speaker 248, the control box 250, and the main wheels 280 and 290. The rear detecting sensors 261, 262, 271, and 272 may be installed in the second part 20.

The motorized wheelchair 1 may connect or separate the first part 10 to or from the second part 20 depending on whether the motorized wheelchair 1 is used. For example, when the motorized wheelchair 1 is used, the first part 10 may be slidably inserted into the second part 20. On the other hand, when the motorized wheelchair 1 is not used, the first part 10 may be slidably drawn out from the second part 20.

Accordingly, the first part 10 may be easily separated from and the second part 20, thus facilitating the storage and transportation of the motorized wheelchair 1. In addition, the separated first part 10 may be fitted into the second part 2 in a state of being stacked on the second part 20. Accordingly, since the total volume of the motorized wheelchair 1 becomes small, the motorized wheelchair 1 may be stored in a relatively small space.

Meanwhile, the first part 10 and the second part 20 may be electrically connected to each other only when the first part 10 is completely inserted into the second part 20. That is, the first part 10 and the second part 20 may be provided in a switch structure that is turned on and off (ON/OFF) to conduct electricity depending on whether they are connected to each other. For example, the first part 10 may have a contact formed in the seat frame 100 supporting the seat assembly 150. The second part 20 may have a contact formed in the insertion groove 221a into which the seat frame 100 is slidably inserted.

Therefore, when the first part 10 and the second part 20 are connected to each other, the contact of the first part 10 is in contact with the contact of the second part 20, so that an on state in which electricity is conducted is achieved. In addition, the motorized wheelchair 1 may operate normally when the first part 10 and the second part 20 are electrically connected to each other.

On the other hand, when the first part 10 and the second part 20 are separated from each other, the contact of the first part 10 is not in contact with the contact of the second part 20, so that an off state in which electricity is not conducted is achieved. Accordingly, since the electrical connection between the first part 10 and the second part 20 is broken when the first part 10 and the second part 20 are separated from each other, it is impossible to force the motorized wheelchair to operate. As a result, the safety of the motorized wheelchair 1 may be improved.

Figure 5:
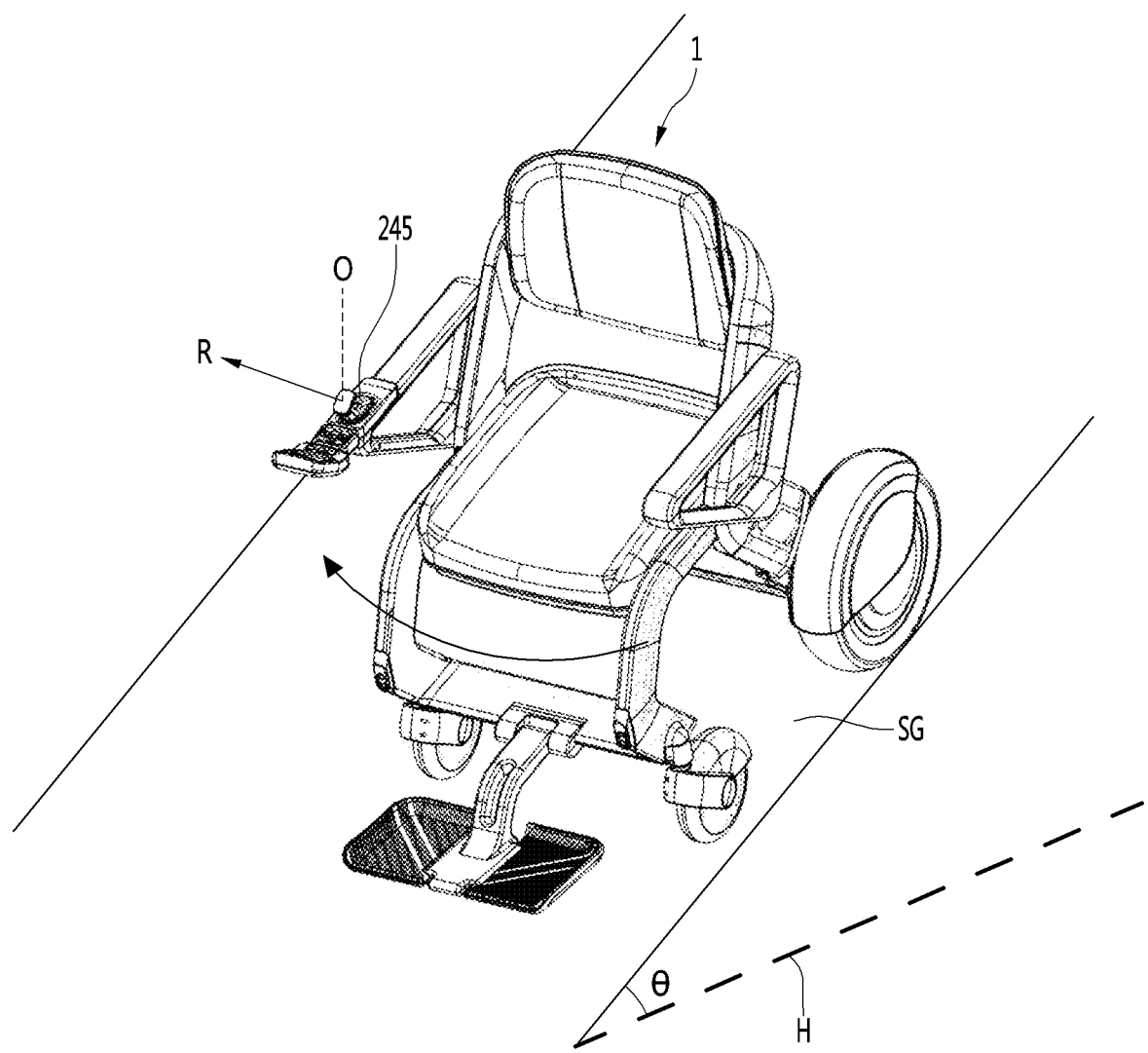
FIG. 5 is an exemplary view showing a state in which a motorized wheelchair runs on a ramp according to an embodiment of the present disclosure.
Figure 6:
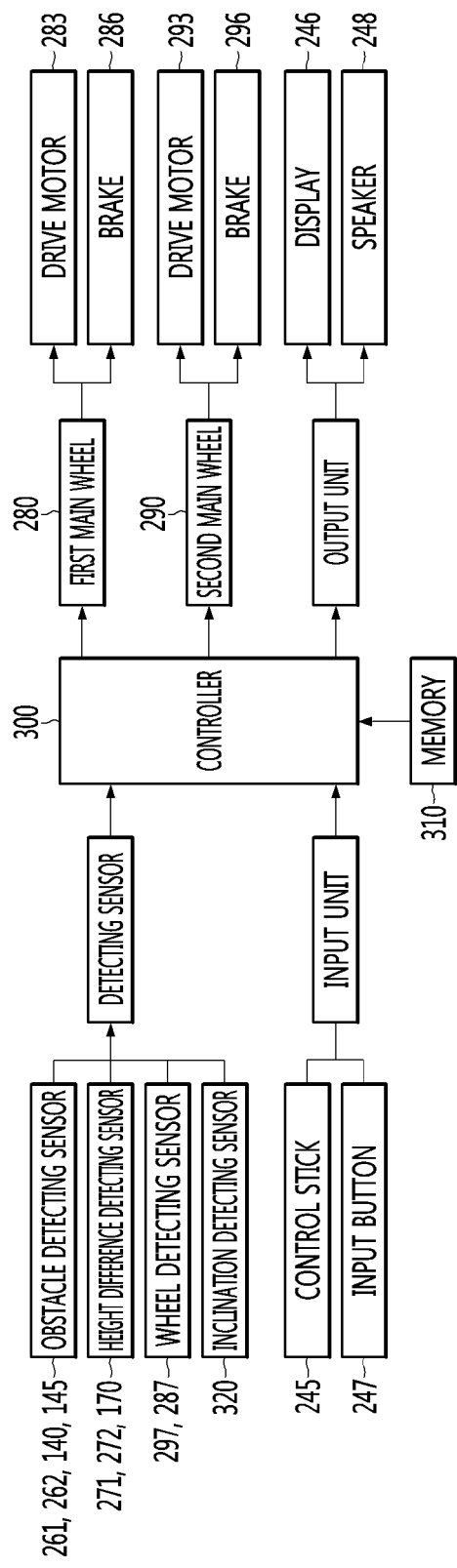
FIG. 6 is a block diagram showing a control configuration of a motorized wheelchair according to an embodiment of the present disclosure.

Referring to FIGS. 5 and 6, a ramp SG may be understood as a ground having a predetermined inclination with respect to the horizontal plane H. That is, the ramp SG may have an inclination angle $\theta$ based on the horizontal plane H. The motorized wheelchair 1 may be inclined by the inclination angle $\theta$ of the ramp when is running on the ramp SG. The motorized wheelchair 1 may accelerate as the inclination angle $\theta$ becomes larger when running down the ramp. Therefore, the motorized wheelchair 1 according to an embodiment of the present disclosure may limit the speed at which the the motorized wheelchair 1 runs down according to the inclination angle $\theta$ of the ramp SG for safety. Such control may be referred to as "ramp speed control" of the motorized wheelchair 1.

In addition, the motorized wheelchair 1 may change the running direction while running on the ramp (SG). That is, the motorized wheelchair 1 may turn on the ramp SG. In this case, when turning without considering the speed of the motorized wheelchair 1 and the inclination angle $\theta$, the risk of overturning and accident of the motorized wheelchair 1 may occur. Accordingly, the motorized wheelchair 1 according to an embodiment of the present disclosure may change a turning operation (or referred to as a turning mode) according to the inclination angle θ and/or the current speed for safety. Such control may be referred to as "ramp turning control" of the motorized wheelchair 1.

On the other hand, the motorized wheelchair 1 may further include an inclination detecting sensor 320 capable of detecting the inclination angle θ of the ramp SG. The inclination detecting sensor 320 may include a tilt sensor that detects a tilt of the motorized wheelchair 1 to detect the inclination angle and a weight sensor that detects a change in force for driving the main wheels 280 and 290 and detect the inclination angle.

The tilt sensor may calculate the inclination angle by detecting a tilt angle when the motorized wheelchair 1 runs on a ramp. The weight sensor may calculate the inclination angle by detecting a change in a torque, a load, and the like, when the main wheels 280 and 290 run on the uphill or downhill road. On the other hand, the technology for detecting the inclination angle of the ramp on which the motorized wheelchair runs using the tilt sensor or the weight sensor is the technology disclosed by the prior literature, and thus a detailed description thereof will be omitted.

The inclination detecting sensor 320 may be installed in the first part 10 or the second part 20. For example, when the inclination detecting sensor 320 is provided as a weight sensor, the inclination detecting sensor 320 may be installed on the main wheels 280 and 290. In addition, when the inclination detecting sensor 320 is provided as a tilt sensor, the inclination detecting sensor 320 may be installed in the seat frame 100.

In addition, the inclination detecting sensor 320 may transmit the calculated inclination angle to the controller 300. That is, the plurality of detecting sensors and the input units provided in the motorized wheelchair 1 may provide information to the controller 300. The controller 300 may control operations of the main wheels 280 and 290 and the output units based on the information.

Here, the detecting sensor may include the front obstacle detecting sensors 140 and 145, the front height difference sensor 170, the rear obstacle detecting sensors 261 and 262, the rear height difference sensors 271 and 272, the rear camera 215, the wheel detecting sensors 287 and 297, and the inclination detecting sensor 320. That is, the detecting sensor may detect a risk factor of surroundings for safe running of the motorized wheelchair 1.

The input unit may include the control stick 245 and the input button 247. The control stick 245 may be provided to adjust the running direction and the speed of the motorized wheelchair 1 while the user holds the control stick 245. That is, the running direction of the motorized wheelchair 1 may be determined along the operation direction of the control stick 245.

The user may input a turning operation of the motorized wheelchair 1 by operating the control stick 245. The controller 300 may control the main wheels 280 and 290 by determining a turning direction so as to correspond to an operation direction of the control stick 245. As one embodiment for inputting the turning operation, the user may operate the control stick 245 to be inclined in the left direction or the right direction R from the center O.

Here, with reference to FIG. 5, when the control stick 245 is operated in the left direction, the controller 300 may control the main wheels 280 and 290 such that the motorized wheelchair 1 turns in a counterclockwise direction. In addition, when the control stick 245 is operated in the right direction, the controller 300 may control the main wheels 280 and 290 such that the motorized wheelchair 1 turns in a clockwise direction.

In addition, the controller 300 may individually control the first main wheel 280 and the second main wheel 290. That is, the controller 300 may individually control the first main wheel 280 and the second main wheel 290 to perform a determined turning operation among a plurality of turning operations (or turning modes). That is, the controller 300 may individually control the first main wheel 280 and the second main wheel 290 according to a turning operation determined during a normal turning, a first inclination turning and a second inclination turning, which will be described later.

The turning operation (or turning mode) may include a normal turning and an inclination turning. The normal turning may be a turning operation that is selected when the motorized wheelchair 1 is in a stationary state on a flat surface or when the inclination angle of a ramp satisfies a condition of being below a preset reference angle.

The inclination turning may be a turning operation selected when the motorized wheelchair 1 is in a moving state in a flat surface or when the motorized wheelchair 1 is in a stationary state or a moving state on a ramp in which the inclination angle is out of a preset reference angle. The normal turning may be defined as a turning in which the center of rotation of the motorized wheelchair 1 is located at an intermediate point between the first main wheel 280 and the second main wheel 29. That is, when the normal turning operation is input, the motorized wheelchair 1 may turn in place.

The inclination turning may be defined as a turning in which the center of rotation of the motorized wheelchair 1 is located at an outer point of any one of the main wheels 280 and 290 or the main wheels 280 and 290. That is, when the inclination turning operation is input, the motorized wheelchair 1 may turn to have a turning radius larger than that of the normal turning.

The inclination turning may include a first inclination turning and a second inclination turning having a larger turning radius than the first inclined turning. The first inclination turning may be defined as a turning in which the center of rotation is located at any one of the first main wheel 280 and the second main wheel 290. The second inclination turning may be defined as a turning in which the center of rotation is located at an outer point of the main wheels 280 and 290, that is, in the outside of the motorized wheelchair 1.

The controller 300 may determine to perform any one of the normal turning, the first inclination turning and the second inclination turning according to a result of comparison of the inclination angle θ of the ramp SG with a preset reference angle. On the other hand, the control stick 245 may be provided with a vibrating device to stimulate the user's tactile sense. For example, the controller 300 may allow the vibrating device to vibrate based on information input from the detecting sensor, thus enabling the user to tactilely recognize a risk factor of surroundings.

The input button 247 may be provided in plurality. In addition, the input button 247 may be provided to facilitate the user's operation of various functions of the motorized wheelchair 1, such as ON/OFF of the battery power, switching of screens output to the display 246, operation of heating wires provided in the seat 152, running route guidance or the like.

The output unit may include the display 246 and the speaker 248. The display 246 may provide visual information to the user, and the speaker 248 may provide audio information to the user. The controller 300 may control the display 236 and the speaker 248 based on information received from the input unit and/or the detecting sensor. For example, the controller 300 may allow the display 246 to output a warning text, a rear image, a running guidance screen, and the like. In addition, the controller 300 may allow the speaker 248 to output a warning sound, a voice guidance, or the like.

In addition, the controller 300 may control operations of the main wheels 280 and 290 based on information input from the input unit and/or the detecting sensor. For example, the controller 300 may control the drive motors 283 and 293 to accelerate or decelerate the speed of the motorized wheelchair 1 based on information detected by the detecting sensor. In addition, the controller 300 may activate the brakes 286 and 296 to brake or decelerate the motorized wheelchair 1 based on information provided from the detecting sensor.

Figure 7:
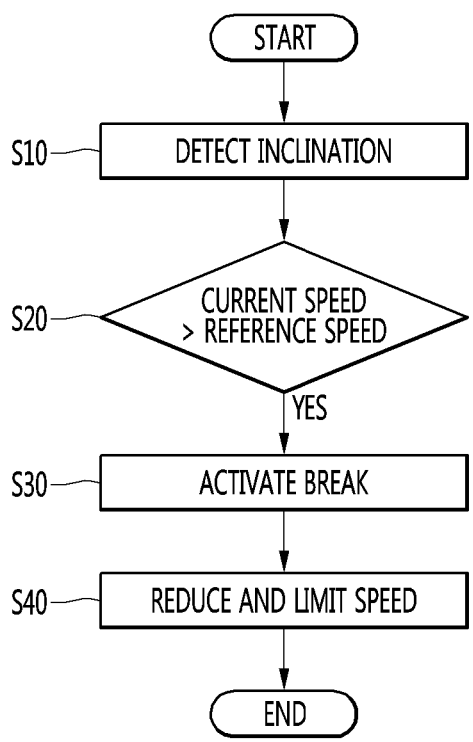
FIG. 7 is a flow chart showing a ramp speed control method of a motorized wheelchair according to an embodiment of the present disclosure.

FIG. 7 is a flowchart of a ramp speed control method of a motorized wheelchair according to an embodiment of the present disclosure. Referring to FIG. 7, the motorized wheelchair 1 may calculate (or detect) an inclination angle θ of a ramp SG from the inclination detecting sensor 320 (S10). The motorized wheelchair 1 may determine whether a current speed of the motorized wheelchair 1 is faster than a preset reference speed based on the calculated inclination angle θ.

Here, the preset reference speed may be understood as the maximum speed at which the motorized wheelchair 1 is limited at the calculated inclination angle θ. In detail, the controller 300 may determine a reference speed that matches the inclination angle θ input from the inclination detecting sensor 320. For example, the controller 300 may determine the reference speed that matches the input inclination angle θ based on speed limit information stored in the memory 310. The speed limit information may be stored as a function of the inclination angle. Therefore, the higher the inclination angle of the ramp SG, the reference speed may decrease.

The controller 300 may calculate rotational speeds of the main wheels 280 and 290 based on information detected by the wheel detecting sensors 287 and 297. The rotational speeds of the main wheels 280 and 290 may be defined as the current speed of the motorized wheelchair 1.

The controller 300 may compare the current speed with the matched reference speed. The motorized wheelchair 1 may activate the brakes 286 and 296 when the current speed is faster than the matched reference speed. That is, the controller 300 may activate the brakes 286 and 296 such that the current speed is reduced to the matched reference speed.

For example, the speed limit information may have settings in which the matched reference speed is set to 10 (km/h) when the inclination angle θ is 10°. That is, when the current speed of the motorized wheelchair 1 running on the ramp SG having the inclination angle θ of 10° is 15 (km/h), the controller 300 may activate the brakes 286 and 296 to reduce the current speed to 10 (km/h).

The motorized wheelchair 1 may limit the current speed so as not to exceed the matched reference speed (S40). That is, the motorized wheelchair 1 may be controlled to maintain the current speed below the matched reference speed. In detail, the controller 300 may control the current speed of the motorized wheelchair 1 not to exceed the reference speed even when a user inputs an acceleration command. For example, when the current speed of the motorized wheelchair 1 is reduced to 10 (km/h), the speed of the motorized wheelchair 1 is not able to exceed 10 (km/h) even when the user operates the input units 245 and 247 to input the acceleration command.

Figure 8:
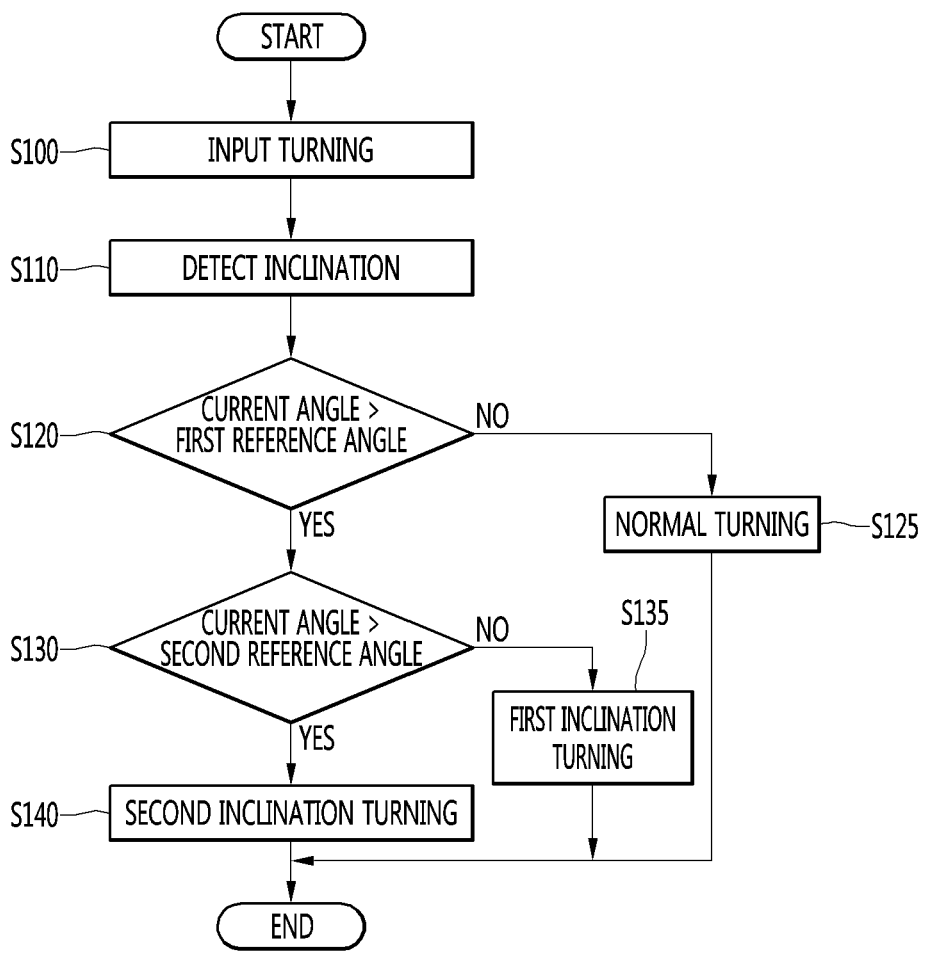
FIG. 8 is a flowchart of a method of controlling a turning on a ramp in a motorized wheelchair according to an embodiment of the present disclosure.

As a result, the motorized wheelchair 1 may not run on the ramp SG to be faster than the matched reference speed. For example, when the current speed of the motorized wheelchair 1 reaches the matched reference speed, the controller 300 may perform control to ignore the acceleration command input by the user. Accordingly, the motorized wheelchair 1 may run on the ramp more safely because the motorized wheelchair 1 is not able to run on the ramp at a certain speed or more FIG. 8 is a flowchart of a ramp turning control method for a motorized wheelchair according to an embodiment of the present disclosure. The ramp turning control and the ramp speed control described above may be performed simultaneously in parallel with each other. That is, the ramp speed control may also be performed while the ramp turning control is performed, and vice versa. Referring to FIG. 8, a user may input a turning operation of the motorized wheelchair 1 by operating the input unit (S100).

In this case, the motorized wheelchair 1 may calculate (or detect) an inclination angle by the inclination detecting sensor 320 (S110). Here, the calculated inclination angle may be referred to as a current angle. For example, when the calculated inclination angle is greater than 3°, the motorized wheelchair 1 may determine that a turning is to be performed on the ramp (SG).

As described above, the motorized wheelchair 1 may perform any one of a normal turning, a first inclination turning and a second inclination turning according to a result of comparison of the calculated inclination angle θ and a preset reference angle. That is, according to a result of comparison of the current angle with the preset reference angle, the controller 300 may individually the first main wheel 280 and the second main wheel 290 to perform any one of the normal turning, the first inclination turning and the second inclination turning.

To this end, the motorized wheelchair 1 may determine whether the current angle is greater than or equal to a preset first reference angle (S120). In detail, the controller 300 may compare the current angle with the first reference angle stored in the memory 320.

Here, the first reference angle is set to the minimum value of the angle at which the the motorized wheelchair 1 may be overturned when the motorized wheelchair 1 performs a normal turning. The minimum value may be changed according to the weight of the user or the current speed of the motorized wheelchair 1. Therefore, the first reference angle may be stored in the memory 320 by defining values that are matched according to the weight of the user or the current speed of the motorized wheelchair 1 as a table.

For example, the first reference angle may be stored as an angle of 10° when the motorized wheelchair 1 is in a stationary state (the current speed is 0), and is stored as an angle of 5° when the motorized wheelchair 1 is in the moving state in which the motorized wheelchair 1 is moving (the current speed is not 0).

As a result of the determination, when the current angle is smaller than the first reference angle, the motorized wheelchair 1 may perform the normal turning. In detail, when it is determined that the current angle is smaller than the first reference angle, the controller 300 may determine that a running ground is a flat surface or a ramp SG in which the normal turning is possibly performed.

In addition, the controller 300 may control the first main wheel 280 and the second main wheel 290 such that the normal turning is performed. Specifically, the controller 300 may control the rotational directions of the first main wheel 280 and the second main wheel 290 to be opposite to each other, and the rotational speeds of the first main wheel 280 and the second main wheel to be equal to each other.

Therefore, the motorized wheelchair 1 may rotate in a clockwise or counterclockwise direction with respect to the center of rotation which is positioned in the middle of the first main wheel 280 and the second main wheel 290. That is, the motorized wheelchair 1 may turn in place.

On the other hand, when the current angle is greater than or equal to the first reference angle, there is a risk of overturning when the motorized wheelchair 1 performs a normal turning. In this case, the motorized wheelchair 1 may prevent the risk of overturning by performing a turning operation in which the center of rotation is moved outward than the normal turning.

To this end, when the current angle is greater than or equal to the first reference angle, the motorized wheelchair 1 may determine whether the current angle is greater than or equal to a second reference angle (S130). Here, the second reference angle may be set to a value larger than the first reference angle. The second reference angle may be set to the minimum value of the angle at which the motorized wheelchair 1 may be overturned may be caused when the motorized wheelchair 1 performs the first inclination turning. The minimum value may be changed according to the weight of the user or the current speed of the motorized wheelchair 1. Accordingly, the second reference angle may be stored in the memory 320 by defining values matched according to the weight of the user or the current speed of the motorized wheelchair 1 as a table.

For example, the second reference angle may be stored as an angle of 20° or more and 50° or less when the motorized wheelchair 1 is in a stationary state, and as an angle of 10° or more and 50° or less when the motorized wheelchair 1 is in a moving state. As a result of the determination, when the current angle is smaller than the second reference angle, the motorized wheelchair 1 may perform the first inclination turning (S135). In detail, when the current angle is determined to be greater than or equal to the first reference angle and less than the second reference angle, the controller 300 may determine that the first inclination turning is possibly performed on the ramp SG.

In addition, the controller 300 may control the first main wheel 280 and the second main wheel 290 such that the first inclination turning is performed. In detail, the controller 300 may perform control such to rotate one of the first main wheel 280 and the second main wheel 290 and stop the other.

Therefore, the motorized wheelchair 1 may turn in the clockwise or counterclockwise direction with respect to the center of rotation which is positioned at the stopped main wheel. Accordingly, the motorized wheelchair 1 may perform a turning with a radius larger than that of the normal turning, thus relatively reducing the risk of overturning.

On the other hand, when the current angle is greater than or equal to the second reference angle, there is a risk of overturning when the motorized wheelchair 1 performs the first inclination turning. In this case, the motorized wheelchair 1 may prevent the risk of overturning by performing a turning operation in which the center of rotation is further moved outward than the first inclination turning.

That is, when the current angle is greater than or equal to the second reference angle, the motorized wheelchair 1 may perform a second inclination turning (S140). In detail, when it is determined that the current angle is greater than or equal to the second reference angle, the controller 300 may control the first main wheel 280 and the second main wheel 290 to perform the second inclination turning.

Therefore, the controller 300 may control the rotational directions of the first main wheel 280 and the second main wheel 290 to be equal to each other, and the rotational speeds of the first main wheel 280 and the second main wheel to be different from each other differently. Here, the rotational speed of the first main wheel 280 and the rotational speed of the second main wheel 290 are relatively different from each other along the turning direction of the motorized wheelchair 1 selected by the input unit. In detail, based on the selected turning direction of the motorized wheelchair 1, the rotational speed of the main wheel having a relatively small rotation radius may be controlled to be smaller than the rotational speed of the main wheel having a relatively large rotation radius.

That is, the controller 300 may control the rotational speed of the main wheel positioned inward to be relatively small based on the turning direction of the motorized wheelchair 1 selected by the input unit. For example, the user may select a clockwise direction as the turning direction of the motorized wheelchair 1 by tilting the control stick 245 to the right while running on downhill. In this case, the rotational speed of the first main wheel 280 located inwardly based on the selected turning direction is controlled to be slower than the rotational speed of the second main wheel 290.

Due to this, the center of rotation of the motorized wheelchair 1 is located outside the motorized wheelchair 1, and may rotate in the clockwise or counterclockwise direction with respect to the center of rotation. As a result, since the second inclination turning is a turning having a radius larger than that of the first inclination turning, the risk of overturning the motorized wheelchair 1 may be prevented.

Meanwhile, the motorized wheelchair 1 may output a warning to the output unit without performing the turning operation, when the current angle corresponds to a limit angle at which the risk of overturning may occur even in the second inclination turning. Here, the limit angle is greater than the second inclination angle, and may be set to the minimum value of angles at which overturning may occurs when the motorized wheelchair 1 performs the second inclination turning.

Therefore, when the current angle is greater than the limit angle, the controller 300 may control the main wheels 280 and 290 not to perform the turning operation despite the input command for the turning operation. Accordingly, the user may safely operate the running of the motorized wheelchair 1 without risk of overturning by confirming the warning output by the output unit.

An aspect of the present disclosure provides a motorized wheelchair which enables easy disassembly and installation and minimizes volume when not in use and a control method thereof. In addition, an aspect of the present disclosure provides a motorized wheelchair is capable of safely running on a ramp by limiting a speed according to an inclination angle of the ramp, and a control method thereof. In addition, an aspect of the present disclosure provides a motorized wheelchair which provides a braking force so as to reduce the torque burden of a motor on a ramp and a control method thereof. In addition, an aspect of the present disclosure provides a motorized wheelchair capable of safely rotating (or turning) on a ramp and a control method thereof. In addition, an aspect of the present disclosure provides a motorized wheelchair which changes a turning mode such that a center of rotation center is changed according to the inclination angle of a ramp, and a control method thereof.

The control method of the motorized wheelchair according to the present disclosure may provide a more economical and stable method of turning the motorized wheelchair. According to an embodiment, a method of controlling a motorized wheelchair, the motorized wheelchair including a seat frame supporting a seat, a back frame to which the seat frame is detachably connected, a first main wheel and a second main wheel respectively installed at both lower ends of the back frame, an inclination detecting sensor which detects an inclination, and a controller which controls the main wheel and the second main wheel, the method includes receiving an input for a turning operation, calculating an inclination angle of a running ground by the inclination detecting sensor, and determining whether the inclination angle is greater than a reference angle.

Furthermore, the method may include, when the inclination angle is smaller than the reference angle, performing a normal turning operation in which a rotational center is located at a midpoint between the first main wheel and the second main wheel. Furthermore, the method may include, when the inclination angle is greater than or equal to the reference angle, performing an inclination turning operation of which a turning radius is larger than a turning radius of the normal turning.

Furthermore, the controller may control a rotational direction of the first main wheel and a rotational direction of a second main wheel to be opposite to each other, and control the rotational speeds of the first main wheel and the second main wheel to be equal to each other, such that the normal turning is performed.

Furthermore, the inclination turning may include a first inclination turning in which a rotational center is located at any one of the first main wheel and the second main wheel, and second inclination turning such that a rotational center is located outside of the first main wheel and the second main wheel.

Furthermore, the controller may rotate one of the first main wheel and the second main wheel and stop the other of the first main wheel and the second main wheel such that the first inclination turning is performed. Furthermore, the controller may control a rotational direction of the first main wheel and a rotational direction of a second main wheel to be identical to each other, and control the rotational speeds of the first main wheel and the second main wheel to be different from each other, such that the second inclination turning is performed.

Furthermore, the controller may control a rotational speed of the main wheel having a smaller turning radius among the first main wheel and the second main wheel to be smaller than a rotational speed of a main wheel having a larger turning radius among the first main wheel and the second main wheel when the second inclination turning is performed. Furthermore, the controller may control a rotational speed of a main wheel located relatively inward to be relatively slow with respect to a turning direction selected by an input unit.

Furthermore, the turning direction selected by the input unit may be a clockwise or counterclockwise direction. Furthermore, the reference angle may be changed according to the weight of the user and the current speed of the motorized wheelchair. Furthermore, the reference angle may include a first reference angle and a second reference angle greater than the first reference angle.

Furthermore, the controller may perform control such that the first inclination turning is performed when the inclination angle is greater than or equal to the first reference angle and less than the second reference angle. Furthermore, the controller may perform control the second inclination turning is performed when the inclination angle is greater than or equal to the second reference angle.

The method may further include detecting a current speed by a wheel detecting sensor installed at the first main wheel and the second main wheel, comparing the current speed with a reference speed preset to correspond to the inclination angle, and activating a brake provided in the first main wheel and the second main wheel when the current speed is greater than the reference speed.

Furthermore, the controller controls the brake such that the current speed is kept below the reference speed. Furthermore, the reference speed is determined as a function of the inclination angle.

According to the present disclosure, it is possible to store the motorized wheelchair in a relatively small loading space. In addition, since the motorized wheelchair is easily disassembled into two parts, it is easy to carry the motorized wheelchair when not in use. In addition, the disassembled two parts may be fitted into each other to be stored as one body, thus minimizing the total volume, and facilitating management. In addition, the disassembled two parts may be easily connected to each other, thereby improving convenience in installation. In addition, it is possible to reduce the load on the drive motor through speed limit according to activation of a brake, thus improving the lifetime of the drive motor and enhancing the running safety of the motorized wheelchair when the motorized wheelchair is running on a downhill road. In addition, since the speed of the motorized wheelchair on the downhill road is limited according to the inclination angle, the user runs on the downhill road comfortably and safely.

In addition, it is possible to provide a safe turning ability of the motorized wheelchair when running on a ramp, thus improving safety of the motorized wheelchair. In addition, more stable and safe rotation may be provided because the motorized wheelchair rotates (or turns) such that the center of rotation of the motorized wheelchair is changed according to the inclination angle of the ramp.

In certain implementations, a motorized wheelchair comprises: a seat frame supporting a seat; a back frame which is provided with a backrest and to which the seat frame is detachably connected; main wheels connected to the back frame; sub-wheels connected to the seat frame; a first sensor configured to detect rotational speeds of the main wheels; a second sensor configured to detect an inclination angle of a ground on which the motorized wheelchair is travelling; and a controller configured to control the rotational speeds of the main wheels based on the rotational speeds detected by the first sensor and the inclination angle detected by the second sensor.

The controller may control the rotational speeds of the main wheels such that a rotational center for a turning operation is changed according to the inclination angle detected by the second sensor. The main wheels may include a first main wheel connected to a first lateral side of the back frame and a second main wheel connected to a second lateral side of the back frame.

When the inclination angle is less than a reference angle, the controller may control the rotational speeds of the main wheels such that the motorized wheelchair performs a first turning operation in which the rotational center for the turning operation is located substantially at a midpoint between the first main wheel and the second main wheel, and when the inclination angle is greater than or equal to the reference angle, the controller may control the rotational speeds of the main wheels such that the motorized wheelchair performs a second turning operation having a turning radius that is greater than a turning radius of the first turning operation.

When the motorized wheelchair is performing the second turning operation, the controller may manage the main wheels such that one of the first main wheel or the second main wheel rotates and a rotation of other one of the first main wheel or the second main wheel is stopped. When the motorized wheelchair is performing the second turning operation, the controller may manages the first main wheel and the second main wheel to rotate in a common direction, and may manage the first main wheel and the second main wheel to have different respective rotational speeds.

When the motorized wheelchair is performing the second turning operation, the controller may control the rotational speed for one of the first main wheel or the second main wheel having a smaller turning radius to be less than the rotational speed for another one of the first main wheel or the second main wheel having a larger turning radius.

The motorized wheelchair may further comprise an input device to receive a user input, and when the motorized wheelchair is performing the second turning operation, the controller may further determine a turning direction based the user input, and manage the rotational speed of one of the first or second main wheels that is located radially inward with respect to the turning direction to be relatively slower that the rotational speed of another one of the first or second main wheels that is located radially outward with respect to the turning direction. The turning direction selected based the user input received by the input device may be a clockwise direction or a counterclockwise direction.

Each of the first main wheel and the second main wheel may include: a drive motor having a stator and a rotor positioned to surround the stator; a wheel shaft that connects the drive motor and the back frame; a rim that extends from radially outward from the rotor; and a brake installed on one side of the rim to selectively provide a braking force. The controller may activate the brakes to reduce the rotational speeds of the first and second main wheels based on a speed limit corresponding to the inclination angle detected by the second sensor. The controller may determine the speed limit as a function of the inclination angle.

In certain implementations, a method of controlling a motorized wheelchair having two rear wheels may comprise determining an inclination angle of a surface on which the motorized wheel chair is travelling; when the inclination angle is less than a reference angle, performing a first turning operation associated with a rotational center located substantially at a midpoint between the two rear wheel; and when the inclination angle is greater than or equal to the reference angle, performing a second turning operation having a turning radius that is greater than a turning radius of the first turning operation.

The rear wheels include a first rear wheel and second rear wheel, and performing the first turning operation may include: controlling a rotational direction of the first rear wheel and a rotational direction of a second rear wheel to be opposite to each other, and controlling a rotational speed of the first rear wheel and a rotational speed of the second rear wheel to be substantially equal to each other.

The rear wheels may include a first rear wheel and second rear wheel, and performing the second turning operation may include performing at least one of: a first turning having a rotational center that is located at one of the first or second rear wheels; or a second turning having a rotational center that is located outside of a region between the first and the second rear wheels. Performing the first turning may include controller one of the first rear wheel or the second rear wheel to rotate while another of the first rear wheel or the second rear wheel is stopped.

The reference angle may include a first reference angle and a second reference angle that is greater than the first reference angle, the first turning may be performed when the inclination angle is greater than or equal to the first reference angle and less than the second reference angle, and the second inclination turning may be performed when the inclination angle is greater than or equal to the second reference angle. The reference angle may correspond to an angle at which the motorized wheelchair may overturns when performing the first turning operation based on a user's weight and a current speed of the motorized wheelchair.

The method may further include detecting a current speed of the motorized wheelchair; comparing the current speed with a reference speed corresponding to the inclination angle; and braking at least one of the rear wheels when the current speed is greater than the reference speed. The at least one of the rear wheels may be braked such that the current speed is maintained below the reference speed, and the reference speed may be determined as a function of the inclination angle.

In certain implementations, a method of controlling a motorized wheelchair having left and right driving wheels comprises: determining an inclination angle of a surface on which the motorized wheel chair is travelling; and controlling respective rotational speeds of the left and right driving wheels when that the motorized wheel chair is performing a turning operation, wherein controlling the respective rotational speeds of the left and right driving wheels includes: controlling the respective rotational speeds of the left and right driving wheels to turn the motorized wheel chair with a first turning radius when the inclination angle is less than a reference angle; and controlling the respective rotational speeds of the left and right driving wheels to turn the motorized wheel chair with a second turning radius that is greater than the first turning radius when the inclination angle is greater than or equal to the reference angle.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a motorized wheelchair having two rear wheels, the method comprising:
   determining an inclination angle of a surface on which the motorized wheel chair is travelling;
   when the inclination angle is less than a reference angle, performing a first turning operation associated with a rotational center located at a midpoint between the two rear wheels; and
   when the inclination angle is greater than or equal to the reference angle, performing a second turning operation having a turning radius that is greater than a turning radius of the first turning operation,
   wherein the rear wheels include a first rear wheel and a second rear wheel, and performing the second turning operation includes performing:
      a first turn having a rotational center that is located at one of the first or second rear wheels, and
      a second turn having a rotational center that is located outside of a region between the first rear wheel and the second rear wheel, the second turn having a turning radius that is greater than a turning radius of the first turn,
   wherein the reference angle includes a first reference angle and a second reference angle that is greater than the first reference angle,
   wherein the first turning operation is performed when the inclination angle is less than the first reference angle,
   wherein the first turn is performed when the inclination angle is greater than or equal to the first reference angle and less than the second reference angle, and
   wherein the second turn is performed when the inclination angle is greater than or equal to the second reference angle.

2. The method of claim 1,
wherein performing the first turning operation includes:
   controlling a rotational direction of the first rear wheel and a rotational direction of a second rear wheel to be opposite to each other, and
   controlling a rotational speed of the first rear wheel and a rotational speed of the second rear wheel to be equal to each other.

3. The method of claim 1,
wherein performing the first turn includes:
   controlling the rear wheels such that one of the first rear wheel or the second rear wheel rotates while another of the first rear wheel or the second rear wheel is stopped.

4. The method of claim 1,
wherein the reference angle corresponds to an angle at which the motorized wheelchair may overturn when the first turning operation is performed based on a user's weight and a current speed of the motorized wheelchair.

5. The method of claim 1, further comprising:
detecting a current speed of the motorized wheelchair;
comparing the current speed with a reference speed corresponding to the inclination angle; and
braking at least one of the rear wheels when the current speed is greater than the reference speed.

6. The method of claim 5,
wherein the at least one of the rear wheels is braked such that the current speed is kept below the reference speed, and
wherein the reference speed is determined as a function of the inclination angle.

* * * * *